United States Patent [19]
Williams

[11] Patent Number: 5,347,482
[45] Date of Patent: Sep. 13, 1994

[54] MULTIPLIER TREE USING NINE-TO-THREE ADDERS

[75] Inventor: Ted Williams, Los Gatos, Calif.

[73] Assignee: HaL Computer Systems, Inc., Campbell, Calif.

[21] Appl. No.: 990,627

[22] Filed: Dec. 14, 1992

[51] Int. Cl.$^5$ ............................................... G06F 7/52
[52] U.S. Cl. ..................................... 364/757; 364/784
[58] Field of Search ............... 364/754, 755, 756, 757, 364/758, 759, 760, 768, 784, 786

[56] References Cited

U.S. PATENT DOCUMENTS

| | | | |
|---|---|---|---|
| 4,799,183 | 1/1989 | Nakano et al. | 364/760 |
| 4,823,300 | 4/1989 | Malinowski | 364/757 |
| 4,999,802 | 3/1991 | Cocanougher et al. | 364/748 |
| 5,132,921 | 7/1992 | Kelley et al. | 364/784 |

OTHER PUBLICATIONS

Wallace, C. S., "A Suggestion for a Fast Multiplier", IEEE Trans. Electron Comput. EC-13:14–17 (1964).
Dadda, L., "Some Schemes for Parallel Multipliers", Alta Freq. 34:349–356 (1965).
Dadda, L., "On Parallel Digital Multipliers", Alta Freq. 45:574–580 (1976).

*Primary Examiner*—Tan V. Mai
*Attorney, Agent, or Firm*—A. C. Smith

[57] ABSTRACT

A multiplier tree sums the partial products of a multiplication operation, employing a regular hierarchical arrangement of bit adders that accept nine initial inputs and a carry input and produce three outputs and a carry output. The regularity of the structure of the bit adder allows it be used to form an array of bit adders to sum twenty-seven input bits and ten carry input bits to produce three output bits and ten carry outputs bits. These bit adders form the basis of the multiplier tree. The multiplier tree using this structure can sum the partial products from a 52 to 54 bit multiply operation in no more adder delays than a Wallace tree, but with a more regular structure. A method for reducing nine input signals to three output signals segregates the input signals into sets of signals and combines them into reduced sets of logically equivalent signals.

10 Claims, 8 Drawing Sheets

MULTIPLIER TREE USING NINE-TO-THREE ADDERS

RELATED APPLICATION

This application is related to the concurrently filed U.S. patent application Ser. No. 07/989,707 filed on Dec. 14, 1992, by Ted Williams, entitled METHOD AND APPARATUS FOR MULTIPLYING DENORMALIZED BINARY FLOATING POINT NUMBERS WITHOUT ADDITIONAL DELAY which is incorporated by reference.

BACKGROUND OF THE INVENTION

1. Field of the Invention

This invention relates to bit adding circuits for summing binary digits, and more particularly, relates to circuits for summing binary partial products resulting from the multiplication of binary operands.

2. Description of the Background Art

There are many possible logical structures for summing the partial product bits resulting from the multiplication of two binary numbers. One known scheme for accomplishing this is a "Wallace" tree that can produce the shortest possible critical path which grows only logarithmically with operand width. See, C.S. Wallace, "A Suggestion for a Fast Multiplier," IEEE Transactions on Electronic Computers, vol. EC-13, pp. 14–17, February, 1964. However, a true Wallace tree requires an irregular structure whose long wire lengths usually add more delay than the Wallace tree might save as compared with a more regular tree structure. These more regular tree structures use pre-wired blocks of adders but the trees still have a total delay that grows only logarithmically with the operarid width. Modern CMOS VLSI implementations of multiplier trees have used structures employing the four-to-two trees and the seven-to-three trees, which are made of combinations of arithmetic adders having four inputs and two outputs, or seven inputs and three outputs, respectively. These multiplier trees are more regular than a Wallace tree but require a greater number of adder delays to sum a large number of partial products. A multiplier tree employing a nine-to-three adder (having nine inputs and three outputs) would be more efficient because it operates in the same number of adder delays as a three-to-two adder, but offers greater uniformity of wiring and simplified circuit layout and design.

SUMMARY OF INVENTION

In accordance with the present invention, a multiplier tree based on nine-to-three adders is used to sum partial products resulting from the multiplication of two binary numbers. A multiplier tree is a parallel bit adder circuit containing a plurality of successive bit adding subcircuits called "tree slices." For a 52 bit input operand the multiplier tree contains 104 tree slices, each tree slice accepting as inputs partial products resulting from the multiplication of binary operands. The partial products input into each tree slice are of equal binary weight. The tree slices accept the partial products and carry inputs of the same or greater weight, sum the inputs, and produce up to two output bits. The outputs of all the tree slices are summed in a conventional manner. The tree slices contain various combinations of nine-to-three adders ("9-3 adders"), three-to-two carry-save adders ("CSAs"), and wires arranged to accept 52 binary inputs. (The same structure of the multiplier tree can accept up to 54 binary inputs; for purpose of illustration, the discussion will focus on the case of 52 input bits.) The 9-3 adders each employ a number of logic elements in an arrangement that sums nine input bits and a carry-in bit in no more adder delays than three consecutive CSAs. The number of carry-out bits from the 9-3 adders matches the number of carry-in bits, and the number of output bits is a factor of the number of input bits. Further, the generation of the carry-out bits is independent of the addition of the carry-in bits, thus avoiding any ripple-line effect. This allows the 9-3 adders to be regularly combined to form 9-3 adder arrays, composed of four 9-3 adders, which are the basic building blocks of the tree slices of the multiplier tree. A multiplier tree of this type requires the same number of adder delays as a Wallace tree using three-to-two adders, but is more regular and has a shorter average wire length.

A 9-3 adder can be composed of six CSAs. In this embodiment, three CSAs accept the nine initial inputs, sum them, and produce six intermediate bit sums. These bits are supplied to two intermediate CSAs, which sum them to produce four intermediate bits. One of the intermediate bits is a carry-out bit to another tree slice in the multiplier tree, and one intermediate bit is inverted in polarity. The remaining two of the intermediate bits are supplied to the sixth CSA, along with a carry-in bit from another tree slice to produce two final output bits along with the inverted bit, where the sum of these three bits and the carry-out bit equals the sum of the original nine input bits and the carry-in bit. Because the number of carry-in bits matches the number of carry-out bits, and the generation of the carry-out bits does not depend on the summing of the carry-in bits, the 9-3 adder can be combined into the 9-3 adder arrays.

A 9-3 adder array is comprised of four 9-3 adders. The 9-3 adder array accepts twenty-seven initial inputs and ten carry-in bits, sums these bits, and produces three output bits in the tree slice containing the 9-3 adder array, and ten carry-out bits to other tree slices. The 9-3 adder array, along with individual 9-3 adders, CSAs and wires, are variously arranged to form the tree slices of the multiplier tree, the number of these units in each tree slice dependent on the number of partial product to be summed at each binary weight.

BRIEF DESCRIPTION OF THE DRAWINGS

FIGS. 6(a)-(c) are a table illustrating the construction of the 104 tree slices 111 used in multiplier tree 101, identifying the number of 9-3 adders 301, CSAs 401, and wires 251 used in each of the tree slices 111.

DESCRIPTION OF THE PREFERRED EMBODIMENT

Figure 1:
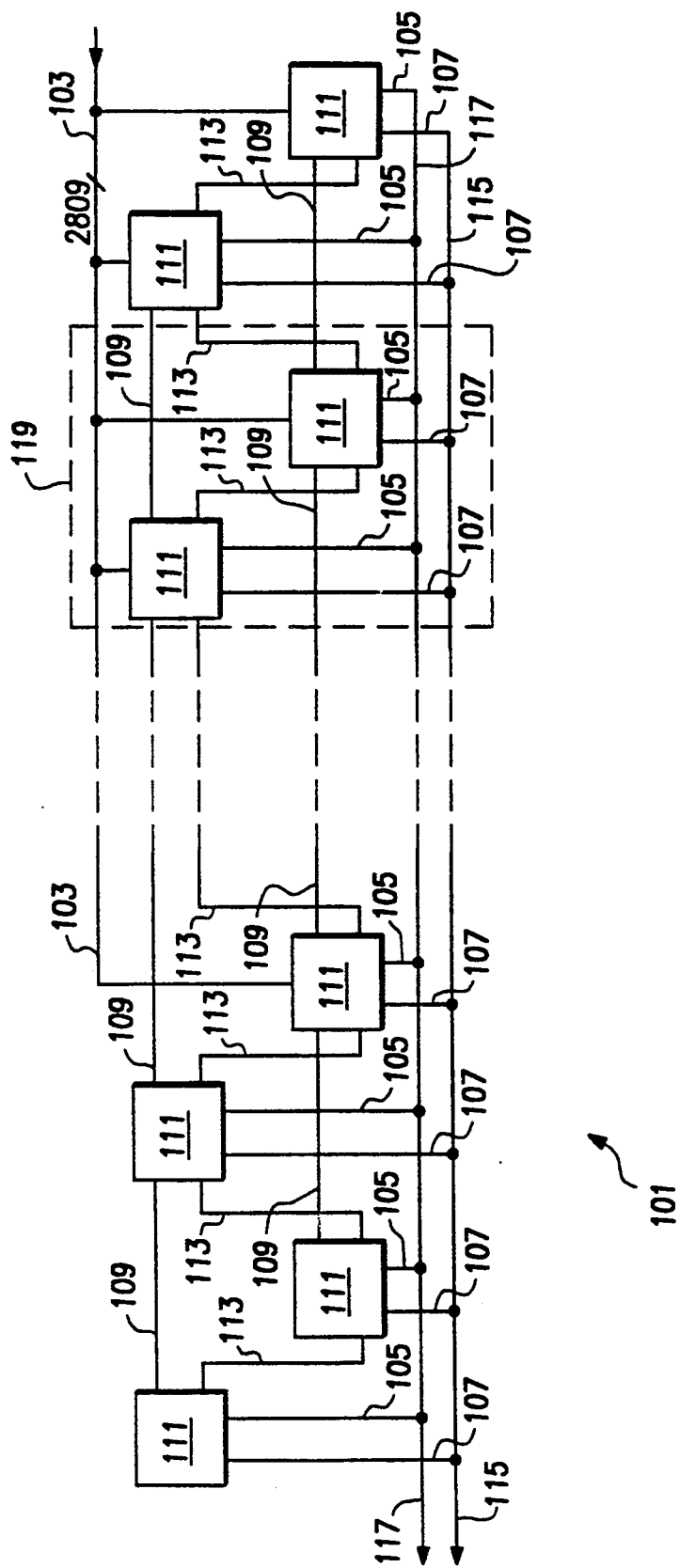
FIG. 1 is a logic block diagram illustrating multiplier tree 101 comprised of 104 regularly arranged tree slices 111, accepting 2704 bits along bus 103 and outputting 104 bits along each of buses 115 and 117.

Referring now to FIG. 1, there is shown multiplier tree 101 for summing binary partial products resulting, for example, from the multiplication of double precision floating point binary numbers. Double precision binary numbers contain 53 bits; 52 bits in the significand and a hidden bit based on the exponent of the number. Multiplying the 52 bits of the significands of two A and B produces 2704 partial products which must be summed to produce a final value equal to the product of A and B. These 2704 partial products are output from a partial product circuit external to multiplier tree 101 along bus 103, segregated according to their binary weights, which range from $2^0$ to $2^{102}$, and input into tree slices 111, each tree slice 111 disposed to accept partial products all of the same weight.

Multiplier tree 101 contains 104 tree slices 111. A "tree slice" is a set of bit adders dedicated to summing partial product and carry bits all having the same binary weight. The first hundred and three tree slices 111 are arranged to accept partial products of weight $2^n$, where n equals 0 to 102, along bus 103. The last tree slice 111 accepts only carry-in bits of weight $2^{103}$ along buses 109 and 113, as do all the other tree slices 111, excepting the first one. Bus 113 couples a given tree slice 111 with its first adjacent neighbor; bus 109 couples a given tree slice 111 with its second adjacent neighbor. Boxed segment 119 contains two tree slices 111 with their couplings, and is repeated fifty times, resulting in a total of one hundred and four tree slices 111. As shown in FIG. 1, each tree slice 111 is numbered by the weight of the partial products it accepts. Thus tree slice 111 numbered "0" accepts partial products of weight $2^0$, tree slice 111 numbered "1" accepts partial products weighted $2^1$. The lower row of tree slices 111 accepts the evenly weighted partial products, the upper row accepts the odd weighted partial products. Boxed segment 119, as repeated, thus shows the tree slices 111 in the upper row for partial products weighted $2^3$ to $2^{101}$, the lower row of tree slices 111 for partial products weighted $2^2$ to $2^{100}$.

The carry-in bits input along buses 113 and 109 are the carry-out bits from first and second adjacent tree slices 111 respectively, produced during the operation of multiplier tree 101. Buses 109 and 113 are used here for illustrative purposes to show the regularity of construction in multiplier tree 101. The data lines comprising buses 109 and 113 are further shown in FIG. 2, discussed below.

In addition to the carry-out bits, each tree slice 111 produces output bit 105, of weight $2^n$ and output bit 107 of weight $2^{n+1}$, where the partial products input along bus 103 are weighted $2^n$. Output bits 105 are combined and output along bus 115; output bits 107 are similarly combined and output along bus 117. As there are one hundred and four tree slices 111, there are one hundred and four output bits in each of buses 115 and 117. Buses 115 and 117 can be coupled to a conventional bit adder to produce the final summation of the two sums output along buses 115 and 117, equal to the product of the input operands.

Figure 2:
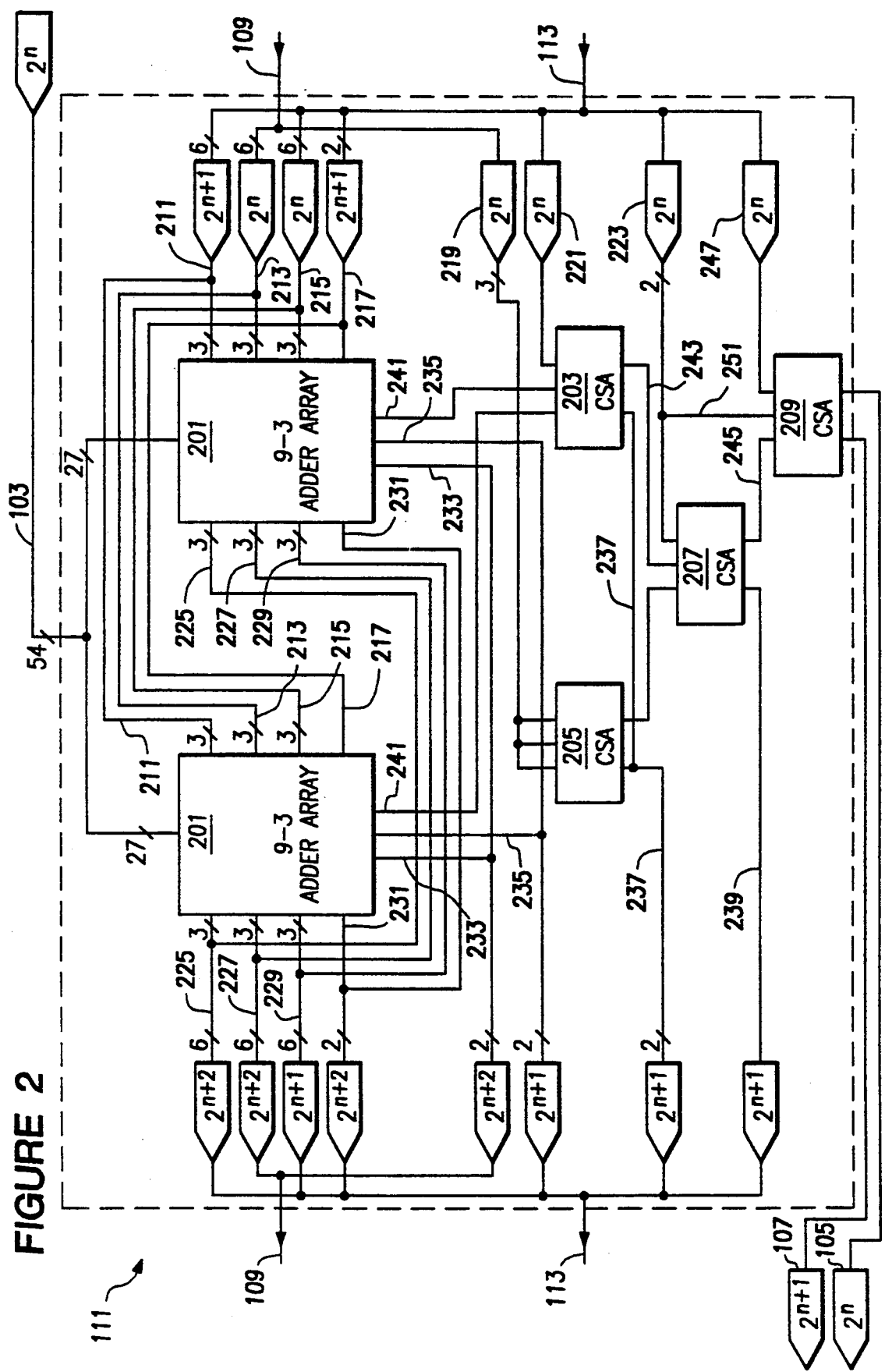
FIG. 2 is a logic block diagram illustrating a tree slice 111 containing two 9-3 adder arrays 201, and four CSAs 203, 205, 207, and 209, accepting inputs along bus 103 and producing output bits 105 and 107.

Referring now to FIG. 2, there is shown a tree slice 111 as used in multiplier tree 101. Tree slice 111 as depicted here is the fifty-second tree slice 111 in multiplier tree 101, and sums 52 partial products of weight $2^{51}$. This tree slice 111 is the time critical path through multiplier tree 31, as it sums the maximal number of partial products having the same weight resulting from the multiplication of the two initial 53 bit operands, less their hidden bits. Other tree slices 111 have fewer inputs for summing fewer bits, but are constructed along similar lines. The construction of other tree slices 111 is discussed below with respect to FIGS. 6(a)-(c).

Tree slice 111 shown in FIG. 2 is comprised of two 9-3 adder arrays 201, and four CSAs 203, 205, 207, and 209. Each 9-3 adder array 201 receives up to 27 partial products along bus 103, and a number of carry-in bits along buses 109 and 113. Each tree slice 111 sums the partial products and carry-in bits, and produces output bits 105 and 107, and carry-out bits on buses 109 and 113 for inputting into adjacent tree slices 111. All output bits from the various adders that have weight $2^n$ remain in tree slice 111 for further summation; all bits that have a weight of $2^{n+1}$ or $2^{n+2}$ become carry-out bits to first and second adjacent tree slices 111 along buses 109 and 113. (For simplicity and generality of discussion, the partial products input into tree slice 111 are said to have a weight of $2^n$.) The inputting and outputting of carry bits between tree slices 111 along buses 109 and 113 employs a number of separate data lines as shown in FIG. 2; reference to these lines will be made by reference to the carry bit they transmit.

All tree slices 111 operate in parallel, summing their input bits through a number of "levels." Each level takes approximately one adder delay, based on the adder units used to construct a 9-3 adder 301, discussed below. Table 1 below shows the number of bits summed in each level, and the number of carry bits output by the adders in each level.

TABLE 1

| Maximum Bits Processed Per Level of Multiplier Tree 101 | | | |
| --- | --- | --- | --- |
| Level | Input Bits | Output Bits | Carry-out Bits | Reference No. |
| 1 | 54 | 36 | 0 | |
| 2 | 36 | 24 | 6 | 225 |
| 3 | 24 | 18 | 12(6,6) | 227,229 |
| 4 | 18 | 12 | 0 | |
| 5 | 12 | 8 | 2 | 231 |
| 6 | 8 | 6 | 4(3,1) | 233,235 |
| 7 | 6 | 4 | 2 | 237 |
| 8 | 4 | 3 | 1 | 239 |
| 9 | 3 | 2 | 0 | |

Table 1 shows the number of maximum partial products input into tree slice 111 as illustrated in FIG. 2. The levels of processing are enumerated in the left most column, followed by the number of bits input into each level for summation, the number of bits output from each level, and the number of carry-out bits output from each level, which is a subset of the total number of output bits. Where the carry-out bits are of different weights, the numbers in parentheses indicate the number of carry-out bits of each weight. The last column indicates the reference number on FIG. 2 which represents the carry-out bits; where there are carry-out bits of different weights, two reference numbers are given.

As shown in Table 1, in each level a number of input bits are summed to produce a reduced set of output bits. These output bits become the inputs of the next level of summation within the tree slice 111, and in some levels, a subset of the output bits become the carry-out bits to the next level in an adjacent tree slice 111. As adders in each level in all tree slices 111 operate in parallel, the carry-out bits from each level are transmitted after the operation of that level in order to become carry-in bits for the next level of summation. This is why the carry-out bits generated at each level are output along individual data lines, as indicated in Table 1, and shown on FIG. 2.

Referring again to FIG. 2, during operation each 9-3 adder array 201 produces three carry-out bits 225 of weight $2^{n+2}$ where the partial products are weighted $2^n$; these bits are carried into the first adjacent tree slice 111 as carry-in bits 211. Since the first adjacent tree slice 111 has a weight of $2^{n+1}$ with respect to a given tree slice 111, carry bits 211 have a weight of $2^{n+1}$. Each 9-3 adder array 201 also produces three carry-out bits 227 of weight $2^{n+2}$; these become carry-in bits 213 to the second adjacent tree slice 111. Since the second adjacent tree slice 111 has a weight of $2^{n+2}$ carry-in bits 213 have a weight of $2^n$ for that tree slice 111. In a similar fashion, carry-out bits 229 and 231 are input into the first adjacent tree slice as carry-in bits 215 and 217 with weights of $2^n$ and $2^{n+1}$ respectively, as shown on FIG. 2.

Each 9-3 adder array 201 comprises the first six levels of summation as detailed in Table 1 above. That is, there are fifty four bits input into 9-3 adder arrays 201 along with the carry-in bits, and six bits are output in the tree slice 111 at the end 25 of six levels of summation. Where the partial products are at weight $2^n$, there are two carry-out bits 233 of weight $2^{n+2}$, two carry-out bits 235 of weight $2^{n+1}$, and two output bits 241 of weight $2^n$. Carry out bits 233 are carried into the second adjacent tree slice 111 as carry-in bits 219. Carry out bits 235 are carried into the first adjacent tree slice 111 as carry-in bits 221. Output bits 241 are input into CSA 203 along with carry-in bit 221.

Tree slice 111 accepts three carry-in bits 219 as inputs into CSA 205. CSAs 203 and 205 perform the seventh level of summation (see Table 1) and output four bits. Two of these bits are carry-out bits 237 of weight $2^{n+1}$ which are carried into the first adjacent tree slice as carry-in bits 223. The other two outputs from CSAs 203 and 205 are output bits 243 which are input, along with a single carry-in bit 223 into CSA 207.

CSA 207 performs the eight level of summation on its inputs, and outputs carry-out bit 239 of weight $2^{n+1}$ and output bit 245. Output bit 245 is input along with a carry-in bit 247, and a carry-in bit 223 along wire 251 into CSA 209. CSA 209 performs the ninth and final level of summation and produces output bit 105 of weight $2^n$ and output bit 107 of weight $2^{n+1}$.

The addition of 52 partial products of equal weight from is done efficiently with a tree slice 111 comprised of two 9-3 adder arrays 201 in conjunction with several CSAs as shown in FIG. 2. This is because each 9-3 adder array 201 has three initial 9-3 adders 301 (see FIG. 3, discussed below) for accepting partial products, each adder accepting nine partial products. This allows up to fifty-four input bits ($2 \times 3 \times 9$), thus accommodating the 52 partial products. A multiplier tree employing 9-3 adders can thus produce two output bits 105, 107 in the minimal number of adder delays. See Table 2, below:

TABLE 2

| | Number of Bits Processed vs. Number of Delays | | | |
|---|---|---|---|---|
| Level | 3-2 Tree | 4-2 Tree | 7-3 Tree | 9-3 Tree |
| 0 | 52 | 52 | 52 | 52 |
| 1 | 35 | | | |
| 2 | 24 | 26 | | |
| 3 | 16 | | 24 | 18 |
| 4 | 11 | 13 | | |
| 5 | 8 | | | |
| 6 | 6 | 7 | 12 | 6 |
| 7 | 4 | | | 4 |
| 8 | 3 | 4 | | 3 |
| 9 | 2 | | 6 | 2 |
| 10 | | 2 | 4 | |
| 11 | | | 3 | |
| 12 | | | 2 | |

Table 2 shows the number of levels, as discussed with respect to Table 1, associated with various tree structures to produce two sums from 52 inputs, where each level is equal to the propagation delay of a conventional carry save adder. The numbers in each column show the number of bits output from each level of summation approximately equal in time to one adder delay, in multiplier trees constructed with various adder configurations. The blank spaces in each column indicate that there are no output bits in the tree slice at that level of summation. Thus for example, there are no output bits listed for levels 1 and 2 in the 9-3 column; this is because during those processing levels the 9-3 adder array 201 (as shown in FIG. 2) produces no output bits that remain in tree slice 111, only carry-out bits to other tree slices.

A multiplier tree, such as a Wallace tree, employing only 3-2 carry save adders ("3-2 Tree") requires 9 levels to process two 52 bit numbers. Multiplier trees using higher order adders, such as 4-2 adders, or 7-3 adders, actually have an increased number of levels even though they would sum more bits per level than a Wallace tree. This is because these adders do not sum all of the input bits at each level of processing, thus losing efficiency. For example, a multiplier tree employing 7-3 adders sums only 49 of the 52 inputs in the first level, the remaining 3 bits pass to the next level. As a result, it takes 12 levels of adders in a 7-3 multiplier tree to process two 52 bit numbers. However, a multiplier tree using six 9-3 adders to accept the initial input bits (as in tree slice 111 shown in FIG. 2) sums all 52 bits in three levels, and outputs 18 bits, which are completely input into two 9-3 adders. A 9-3 adder multiplier tree thus results in the same number of adder delays as a Wallace tree employing 3-2 full adders. However, because a 9-3 adder multiplier tree has a shorter average wire length and is more regular than a Wallace tree, it will operate more efficiently and quickly.

Figure 3:
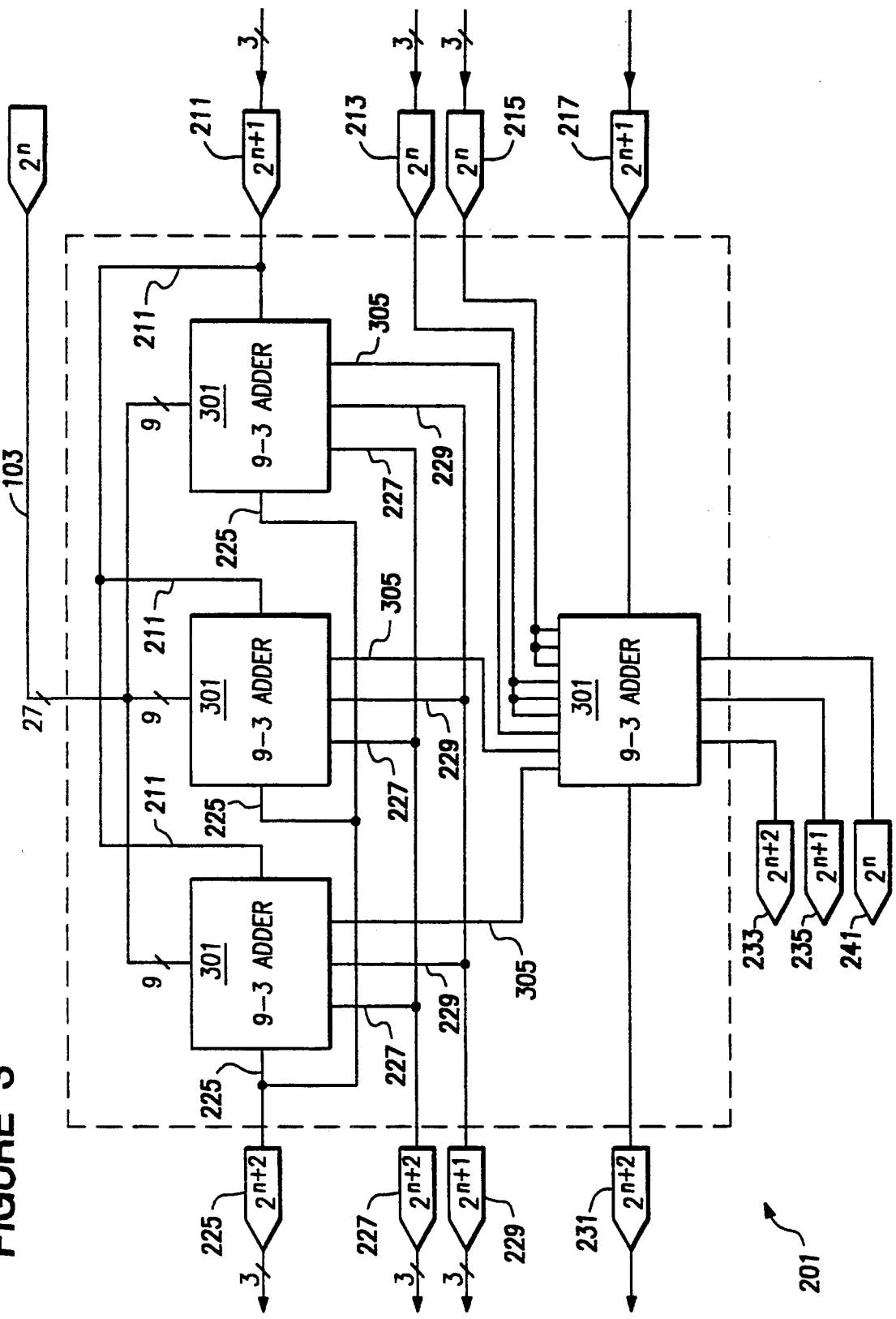
FIG. 3 is a logic block diagram illustrating a 9-3 adder array 201 containing four 9-3 adders 301, accepting inputs along bus 103, and carry-in bits 211-217 and producing outs 233, 235, and 241, and carry-out bits 225-231.

Referring now to FIG. 3, there is shown a 9-3 adder array 201 comprised of four 9-3 adders 301. In 9-3 adder array 201 three 9-3 adders 301 are each disposed to receive nine partial products of weight $2^n$ along bus 103, and a carry-in bit 211 having weight $2^{n+1}$ from a prior adjacent tree slice 111. Each such 9-3 adder 301 sums these ten inputs and produces carry-out bits 225, 227, 229, and output bit 305. Carry-out bits 225 have a weight of $2^{n+2}$ and are carried out to a first adjacent tree slice 111 as shown on FIG. 2, becoming carry-in bit 211. Carry-out bits 227 likewise have a weight of $2^{n+2}$ and are carried out to second adjacent tree slice 111 as carry-in bits 213. Carry-out bits 229 have a weight of $2^{n+1}$ and are carried out to a first adjacent tree slice 111 as carry-in bits 215. Output bits 305 have a weight $2^n$ and are applied to a fourth 9-3 adder 301, along with carry-in bits 213, 215, and 217 from another adjacent tree slice 111, where each of carry-in bits 213 and 215 have a weight of $2^n$ and carry-in bit 217 has a weight of $2^{n+l}$. The fourth 9-3 adder 301 sums its ten inputs and produces three output bits 241, 235, and 233 of weight $2^n$, $2^{n+1}$ and $2^{n+2}$, respectively, and a carry-out bit 231 of weight $2^{n+2}$. The sum of 231, 233, 235, and 241 equals the sum of the twenty-seven partial products and carry-in bits 211, 213, 215, and 217.

Referring again to Table 1, the summation of the partial products input from bus 103 and the carry-in bits 211 into the two 9-3 adder arrays 201 occurs during levels 1 through 6. As the table shows, there are up to 54 bits input into the two 9-3 adder arrays 201 during level 1. These two 9-3 adder arrays 201 produce 36 bits internally; there are no carry-out bits during level 1. These 36 bits become the inputs to level 2. During level 2 there are twenty-four bits produced within the two 9-3 adder arrays 201, six of which are carry-out bits 225. These six carry-out bits are a subset of the inputs to level 3. During level 3 eighteen bits are produced, twelve of which are carry-out bits 227 and 229. During level 4 twelve bits are produced, but there are no carry out bits. During level 5, the twelve input bits are summed to 8 bits, with 2 bits carried out. Finally, during level 6, eight input bits are summed to 6 outputs, shown on FIG. 2 as carry-out 233, 235, and output bit 241.

Figure 4:
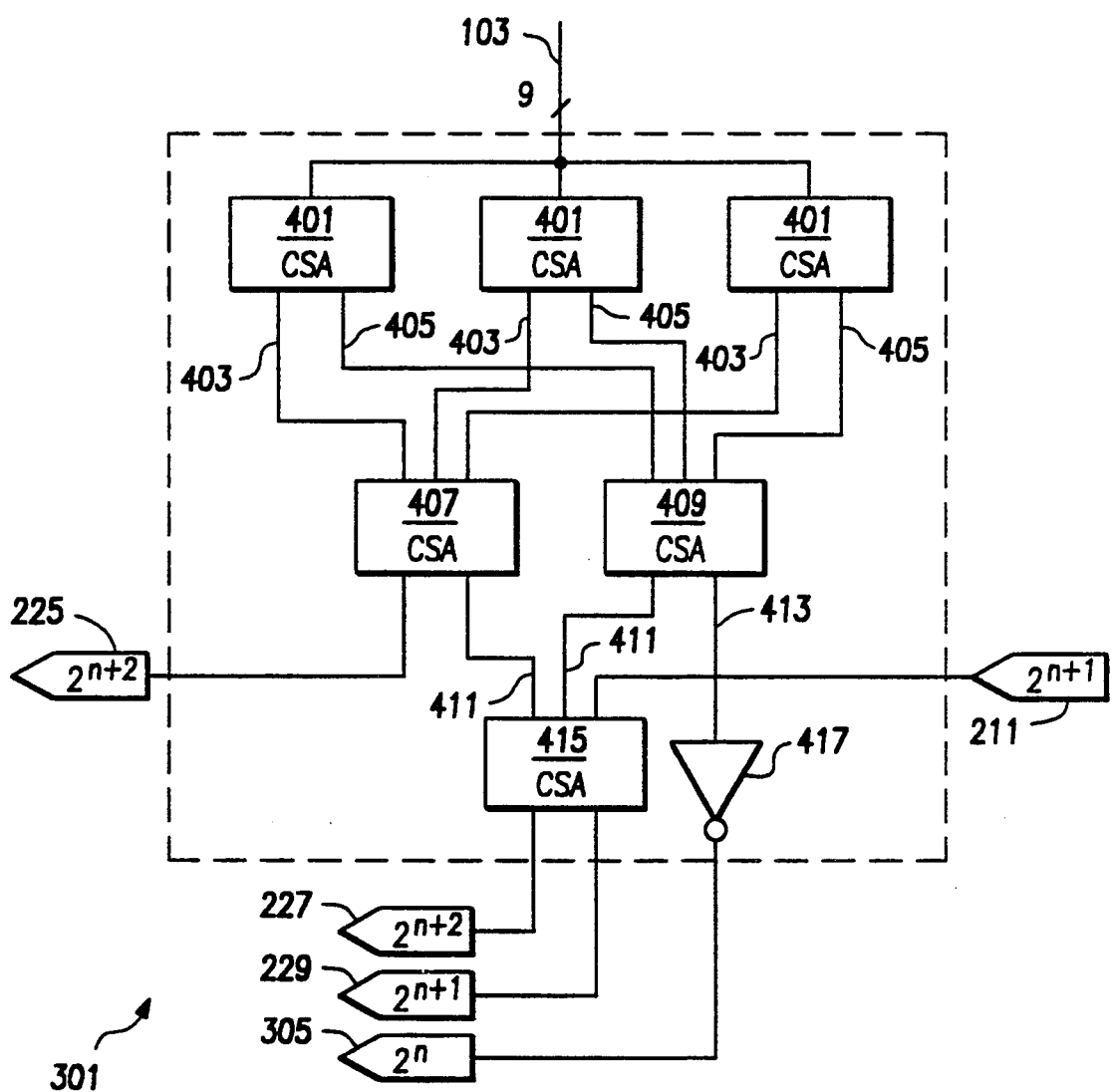
FIG. 4 is a logic block diagram illustrating a 9-3 adder 301 containing six CSAs identical to CSA 40 accepting inputs along bus 103 and carry-in bit 211, and producing outputs 2) 235, and 241, and carry-out bit 225.

Referring now to FIG. 4, there is shown one embodiment of a 9-3 adder 301. A 9-3 adder 301 in general is disposed to accept nine inputs along a bus, such as bus 103, as the initial inputs into a structure of logic gates, and a carry-in bit 211 into the middle of the logic gate structure. The 9-3 adder 301 sums these inputs and produces three output bits the "bottom" of the adder, and a carry out bit. In the illustrated embodiment, the three output bits are carry-out bits 227, and 229, and output bit 305; the carry-out bit is carry-out bit 225. The output of carry-out bit 225 is independent of the input of carry-in bit 211. The sum of carry-out bits 225, 227, 229 and output bit 305 equals the summation of the nine inputs bits from bus 103 and carry-in bit 211. Any arrangement of logic gates that operates in this manner is a 9-3 adder 301.

FIG. 4 shows one possible construction of a 9-3 adder 301 comprising of six CSAs. CSAs 401, 403, 405 and 407 in this embodiment are all of conventional design. Each CSA 401 at the input level of 9-3 adder 301 receives 3 input bits of weight $2^n$ from bus 103, sums these input bits, and produces an output bit 405 of weight $2^n$ and an output bit 403 of weight $2^{n+1}$. Output bits 405 from all CSAs 401 at the input level are applied to CSA 409, which sums these bits and produces output bit 413 weighted $2^n$ and output bit 411 weighted $2^{n+l}$. Output bits 403 from all CSAs 401 at the input level are applied to CSA 407 which sums these bits and produces carry-out bit 225 weighted $2^{n+2}$ and output bit 411 weighted $2^{n+1}$. Carry out bit 225 of CSA 407 is carried out, along with other carry-out bits 225 to a first adjacent tree slice 111, becoming carry-in bit 211 in that tree slice. Output bits 411 from CSAs 407 and 409 are applied, along with carry-in bit 211 of weight $2^{n+1}$ from a prior adjacent tree slice 111, to CSA 415 which sums these bits and produces carry-out bits 227 and 229 of weights $2^{n+1}$ and $2^{n+2}$, respectively. Output bit 413 of weight $2^n$ from CSA 409 is inverted in NOT gate 417 to match its polarity with carry-out bits 227 and 229 from CSA 415, becoming output bit 305.

The construction of a 9-3 adder 301, as in FIG. 4, shows that it can be used to create regular, hierarchical tree slices for use in multiplier tree such as multiplier tree 101. First, the output width, the number of bits output from the adder, is a factor of the input width, as 3 is a factor of 9. This allows the 9-3 adders 301 to be hierarchically arranged as in 9-3 adder array 201. Second, the number of carry-in bits match the number of carry-out bits. That is, 9-3 adder 301 accepts 1 carry-in bit 211 of weight $2^{n+l}$ and outputs 1 carry-out bit 225 of weight $2^{n+2}$. This allows the adders to be sequentially arranged to accept corresponding carry-in and carry-out bits. Finally, there is no ripple path from carry-in bit 211 to the carry-out bit 225. The production of carry-out bit 225 is not dependent on the input of carry-in bit 211, but rather, is dependent only on the outputs from CSAs 401 and 407, which in turn are dependent only on the top level inputs. Accordingly, all carry-out bits 225 in level 2 of the entire multiplier tree 101 are produced in parallel, after the 25 completion of level 2; all the other carry-out bits in the lower levels are similarly produced. This allows all tree slices 111 to operate in parallel. Again, any configuration of logic gates satisfying these criteria while accepting nine inputs and a carry input, and producing three outputs and a carry out bit would be a 9-3 adder 301.

Because the 9-3 adder 301 possess these three properties, the 9-3 adder arrays 201, which are formed from four 9-3 adders 301, also have these properties, and thereby allow the construction of the tree slices 111. The output width of each 9-3 adder array 301, three, is a factor of the input width, twenty-seven. The number of carry-in bits of a given weight match the number of carry-out bits, with an increase in weight. Each 9-3 adder array 201 accepts carry-in bits and produces carry-out bits as follows:

| Number of Carry In Bits, Weight | Number of Carry Out Bits, Weight |
| --- | --- |
| (3)211,$2^{n+1}$ | (3)225,$2^{n+2}$ |
| (3)213,$2^n$ | (3)227,$2^{n+2}$ |
| (3)215,$2^n$ | (3)229,$2^{n+1}$ |
| (1)217,$2^{n+1}$ | (1)231,$2^{n+2}$ |

Finally, as shown in FIGS. 3 and 4, the production of carry-out bits 225, 227, 229, and 231 is not dependent on the inputs of carry-in bits 211, 213, 215, and 217. This allows the 9-3 adder arrays 201 to be regularly combined, as in FIG. 2, to create the tree slices 111.

Figure 5:
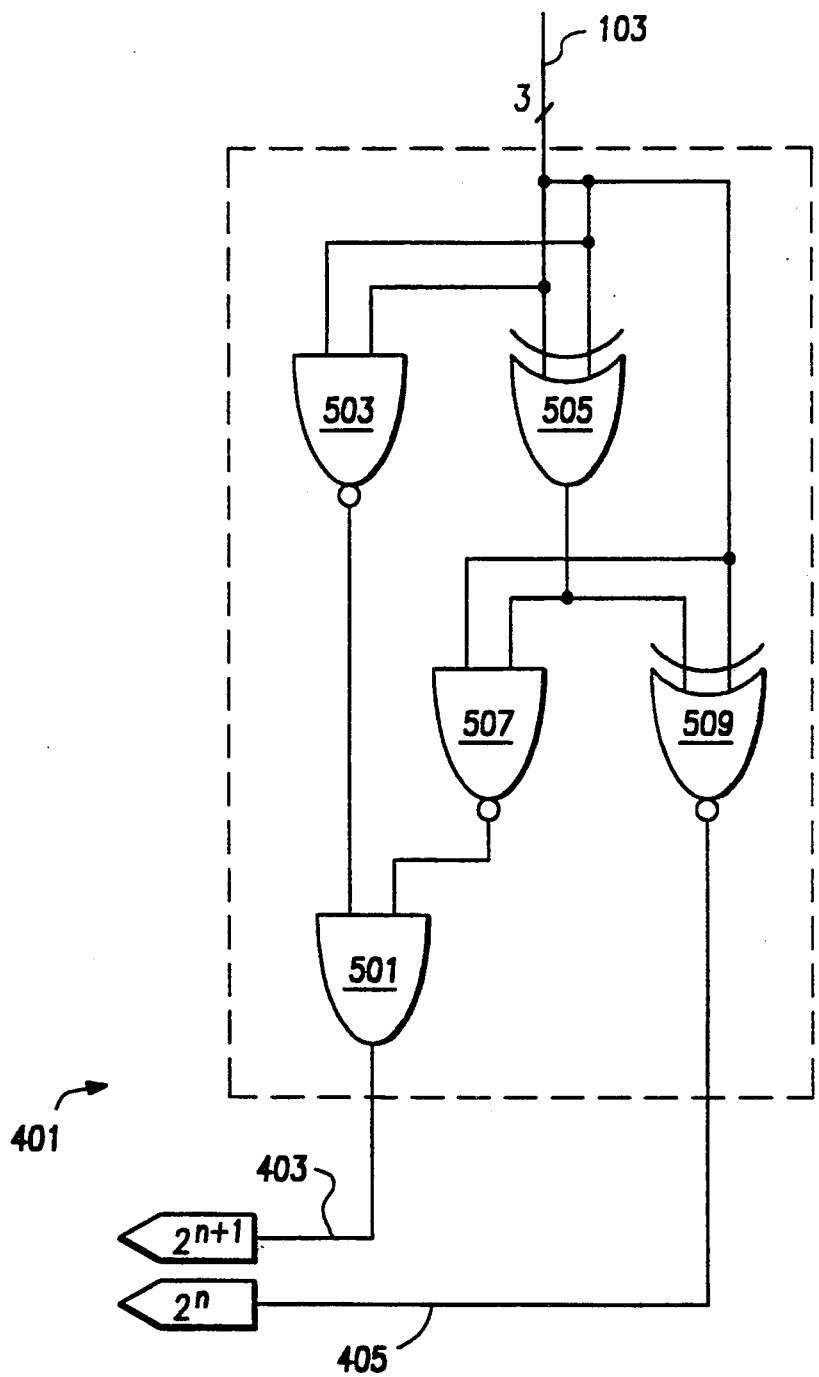
FIG. 5 is a logic block diagram illustrating a conventional CSA 401 containing AND gate 501, NAD gates 503 and 507, and NOR gate 505, and XNOR gate 509, accepting 3 inputs along bus 103, and producing outputs 403 and 405.

Referring now to FIG. 5, there is shown a schematic diagram of a CSA 401 as used in 9-to-3 adder 301, as is commonly known in the art. The CSA 401 accepts 3 inputs of weight $2^n$ along bus 103, and through the illustrated logic of NAND gates 503, and 507, AND gate 501, XOR gate 505, and XNOR gate 509 produces output bit 405 of weight $2^n$ and output bit 403 of weight $2^{n+1}$, which outputs are logically inverted to ease circuit design. CSAs 203, 205, 207, and 209 are of similar construction and operation.

As stated above, the tree slice 111 shown in FIG. 2 is the fifty-second tree slice 111 in multiplier tree 101, and is the most complex slice, having to process the greatest number of partial products. Other tree slices 111 designated for adding fewer bits will have a fewer number of 9-3 adder arrays 201 and CSAs 203, as a function of the number of partial products m, as follows.

| | |
|---|---|
| Where p is the number of 9-3 adders 301 used in a level, p = (m + 1)/9. | (Eq. 1). |
| Where s is the number of CSAs in a level, s = the greater of zero or the integer component of ((m − p*9) + 1)/3 | (Eq. 2). |
| Where w is the number of wires in a level, w = the greater of zero or the integer component of (m − p*9 − s*3) | (Eq. 3). |

These formulas determine for each tree slice the number of adders in each level of processing, based on the initial number of partial products m input into each tree slice, where m ranges from 1 to 52 for the first fifty-two tree slices, and 51 to 1 for the next fifty-one tree slices. The last remaining tree slice is allocated adders using the same formulas based on the number of carry inputs starting at level 2.

The number of inputs m into each subsequent level of multiplier tree 111 is determined by the number of adders and carry bits in the prior levels. Because the adders used in each level each output only one bit which has a weight equal to the weight of the original input bits, the number of inputs m in each level is determined by counting the number of 9-3 adders 301, CSAs 401 and wires from the previous levels, rather than counting the total number of outputs in each level. Accordingly, the number of inputs in each level includes the number of CSAs and wires in prior level of the tree slice 111, plus the number of CSAs in the first prior tree slice 111. As each 9-3 adder 301 uses three levels of processing, they contribute an input only in levels 4 and 7. Further, as each 9-3 adder in levels 1 and 4 produces carry-out bits from its second and third levels to the second adjacent tree slice 111, these carry-out bits are added as inputs in levels 3 and 4 (for 9-3 adders 301 in level 1) and 6 and 7 (for 9-3 adders 301 in level 4). Similarly, each 9-3 adder 301 in levels 1 and 4 produces one carry-out bit to the first adjacent tree slice 111, which must be added to the inputs in levels 4 and 7. Finally, the number of inputs in levels 3 and 6 is reduced by 1 for each 9-3 adder 301 in the first prior tree slice 111, as these adders "consume" a carry-out bit. A complete schematic layout showing the number of 9-3 adders 301, CSAs 401, and wires used in multiplier tree 101 is shown in FIGS. 6(a)–(c).

Figure 6A:
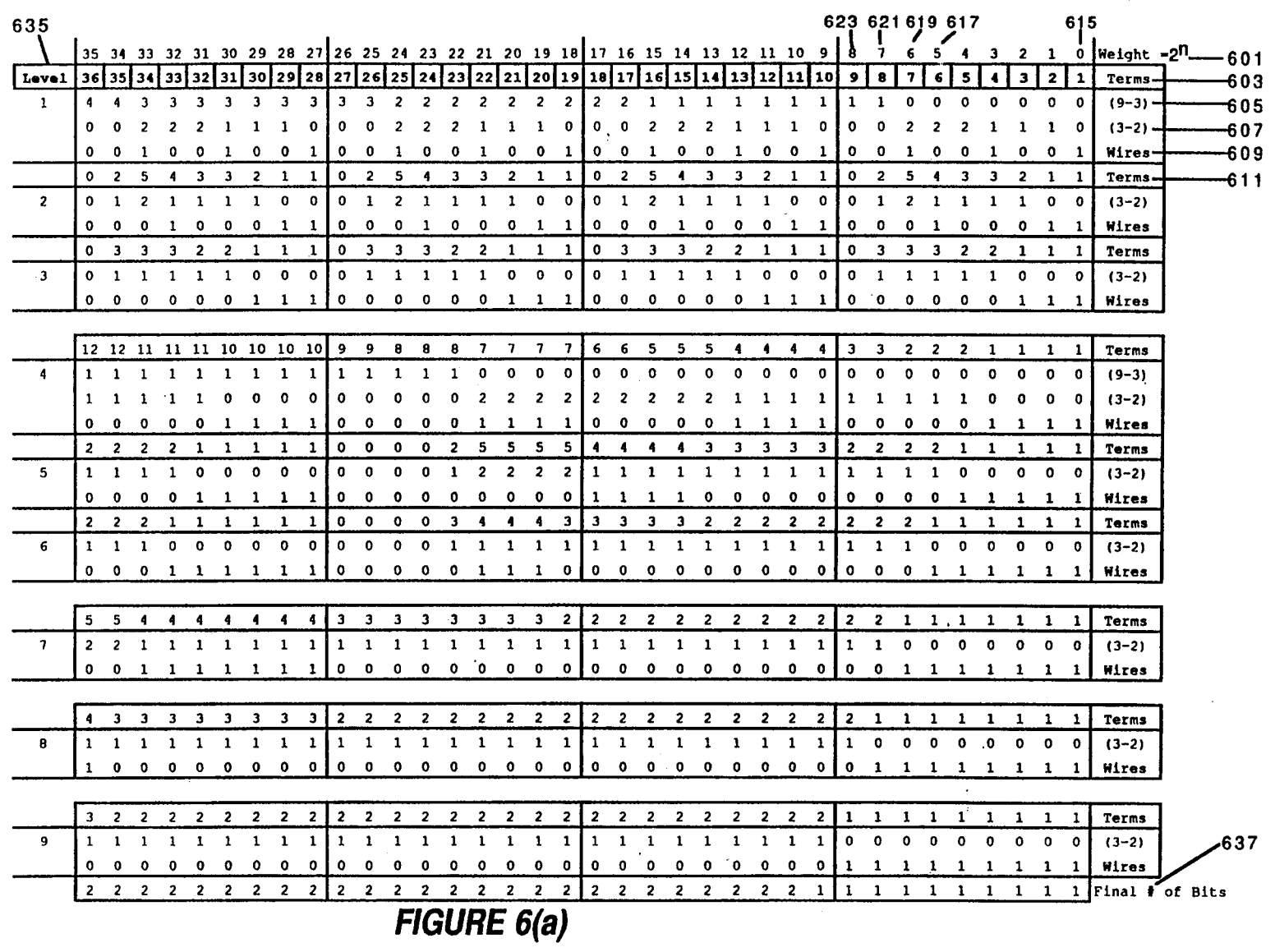
Figure 6B:
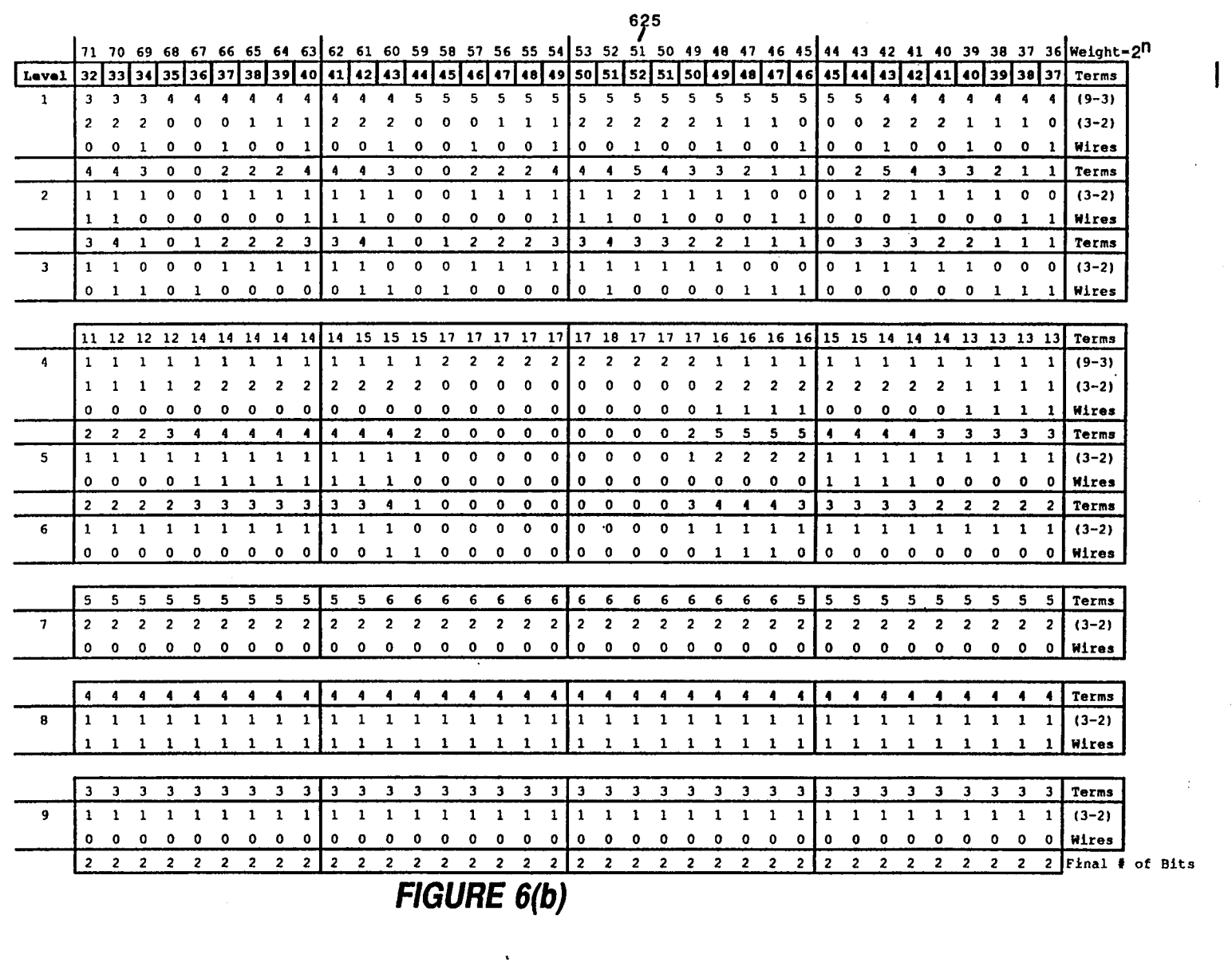
Figure 6C:
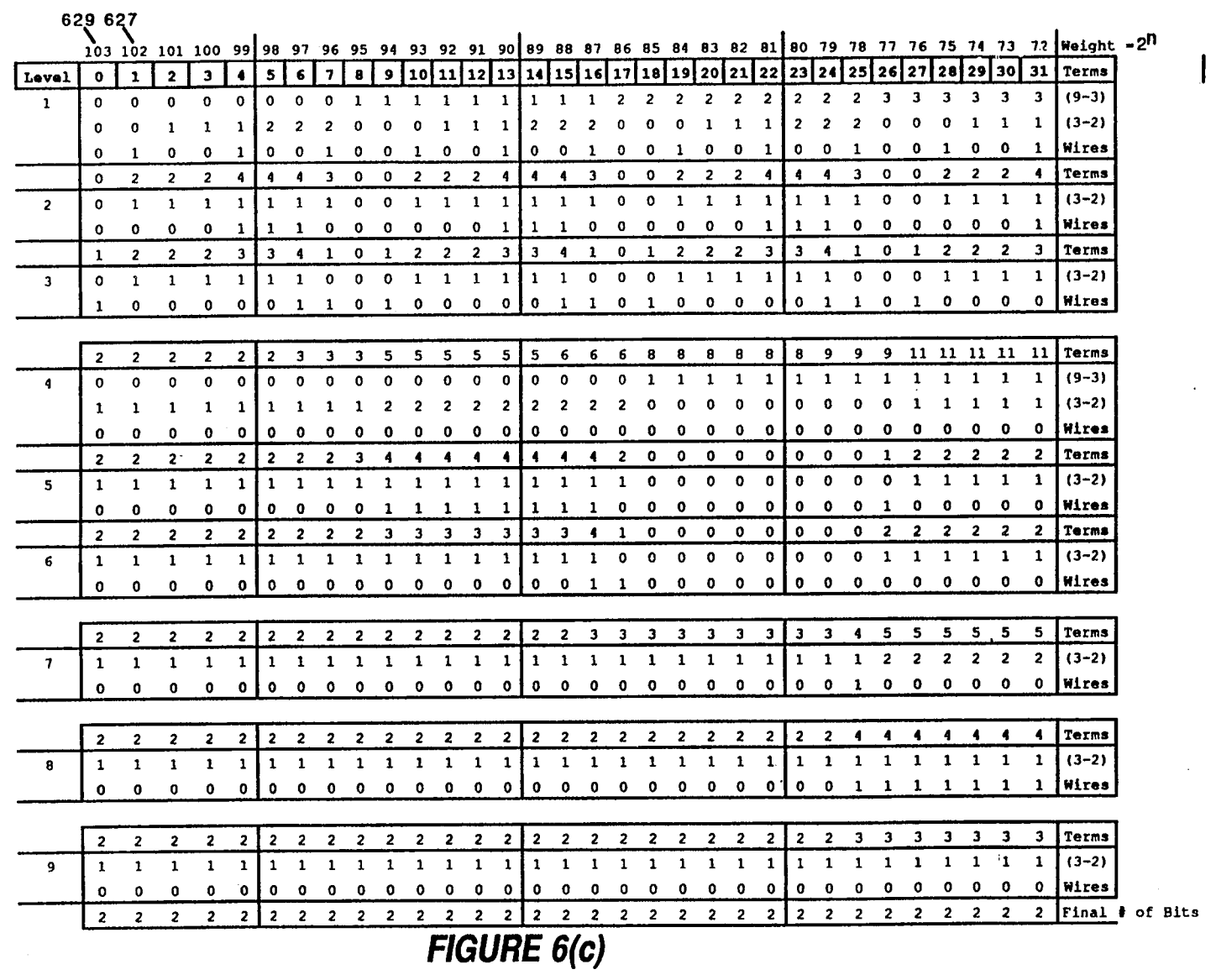

Referring now to FIGS. 6(a)–(c), an illustration is shown of the allocation and hierarchical arrangement of adders in tree slices 111 in multiplier tree 101 of FIG. 1. The figure shows the number of 9-3 adders 301, CSAs 401 and wires 251 needed to construct each of the 104 tree slices 111. The figure is read as follows.

Top row 601 of the table shown in FIGS. 6(a)–(c) (FIG. 6) labeled "Weight=$2^n$" indicates for each tree slice 111 the bit weight of the partial products to be summed in that tree slice 111. Reading from right to left, the bit weights range along top row 601 from 0 to 35 on FIG. 6(a), 36 to 71 on FIG. 6(b), and 72 to 103 on FIG. 6(c). On FIG. 6(a) column 615 represents the tree slice 111 for the least significant bit weight $2^0$ (shown on FIG. 1 as tree slice 111 numbered "0"). On FIG. 6(c), columns 627 represents the tree slice 111 for the most significant partial product bit weighted $2^{102}$. Column 629 represent tree slice 111 for carry bits weighted $2^{103}$. This tree slice 111 accommodates carry-out bits generated during various levels of processing in the prior tree slices 111.

The numbered columns across row 603 identify the number of partial products input along bus 103 into the top level of each tree slice 111. These numbers correspond to the serial numbering of the tree slices 111 in FIG. 1. For example in FIG. 6(a), there is one partial product of weight $2^0$, and two partial products at weight $2^1$, representing the first two tree slices 111 in FIG. 1. FIG. 6(b) shows that the maximum number of partial products input into multiplier tree 101 occurs in column 625, with fifty-two partial products of weight $2^{51}$ input into the fifty-second tree slice 111, as shown in FIG. 2. The structure of multiplier tree 101 at this point defines the critical time path for the overall summation process.

Row 605, labeled on the right as "9-3" indicates the number of 9-3 adders 301 used to sum the partial products in level 1. In the preferred embodiment, a 9-3 adder 301 is used when there are at least 8 partial products or "terms" to process, as seen in FIG. 6(a) in the columns 621 and 623 where there are 8 and 9 terms respectively.

Row 607, labeled on the right as "3-2" indicates the number of CSAs 401 allocated in level 1; the other rows so labeled indicate the number of CSAs 401 allocated in the various levels. In FIG. 6(a), in column 619, where there are 7 partial products weighted $2^6$, two CSAs 401 are allocated. This leaves a single input, which as the next row 609 labeled "Wires" shows, is allocated a single wire 251.

Row 611, labeled "Terms" counts the number of outputs from the previous level 1, as the inputs to level 2. Continuing the example with column 619, there are 5 output terms: one each from the two CSAs 401 and wire in column 619, and one each from the carry bits from the two CSAs 401 in column 617.

Column 635, labeled "Level" and showing the numerals 1 through 9, refers to the processing levels in multiplier tree 101, as discussed with respect to Tables 1 and 2. The allocation of adders and wires in each of these levels in FIG. 6 corresponds to the allocation of adders in each level of tree slices 111 as shown in FIG. 2, and as previously discussed with respect to equations 1–3.

Row 637, labeled "Final # of bits" shows the number of bits output from each tree slice 111 along output bits 105 and 107 (FIG. 1) for final summation. Row 637 shows that for all tree slices 111, and hence for all bit weights, the output is no more than two bits, corresponding to the two output bits 105 and 107. Accordingly, multiplier tree 101 sums the entire body of partial products resulting from the multiplication of two 52 bit operands in the same number of adder delays as a Wallace tree using conventional carry save adders.

I claim:

1. A nine-to-three bit adder for summing nine partial products in a multiplier tree, comprising:
   first logic means having nine inputs for receiving and summing nine partial products of weight $2^n$, where n is an integer, and having six outputs, and producing three primary output bits of weight $2^n$ and producing three primary output bits of weight $2^{n+1}$, such that the combined value of the output bits equals the combined value of the nine partial products;
   second logic means having six inputs coupled to the outputs of first logic means for receiving and summing the six primary output bits, and having four outputs for producing a carry-out bit of weight $2^{n+1}$ to be applied to another logic means in the multiplier tree, two secondary output bits of weight $2^{n+1}$ and a third secondary output bit of weight $2^n$, such that the combined value of the three secondary output bits and the carry-out bit equals the combined value of the six primary output bits;

third logic means having three inputs coupled to the outputs of the second logic means for receiving and summing the three secondary output bits, having an input coupled to another logic means in the multiplier tree for receiving a carry-in bit of weight $2^{n+1}$, for summing the three secondary output bits and the carry-in bit, and having three outputs for producing three final output bits, having weight $2^{n+2}$, $2^{n+1}$, and $2^n$ respectively;

such that the combined value of the three final output bits and the carry-out bit equals the combined value of the nine partial products and the carry-in bit, and such that the production of the carry-out bit is logically independent on the input of the carry-in bit.

2. A nine-to-three bit adder for summing partial products resulting from a multiplication of two binary operands, comprising:

first, second and third logic means each having three inputs for receiving and summing the partial products having weight $2^n$, where n is an integer, and two outputs, each first, second and third logic means producing first intermediate output bit of weight $2^n$, and a second intermediate output bit of weight $2^{n+1}$, such that the combined value of first and second intermediate output bits equals the combined value of the received partial products;

a fourth logic means having inputs coupled to the outputs of first, second, and third logic means for receiving and summing first intermediate output bits, and having outputs, and producing a fourth intermediate output bit of weight $2^n$ and a fifth intermediate output bit of weight $2^{n+1}$, such that the combined value of fourth and fifth intermediate output bits equals the combined value of first intermediate output bits;

a fifth logic means having inputs coupled to the outputs of first, second, and third logic means for receiving and summing second intermediate output bits and having outputs, and producing another fifth intermediate output bit of weight $2^{n+1}$ and a carry-out bit of weight $2^{n+2}$ to be applied to a first bit adder in a multiplier tree, such that the combined value of the fifth intermediate output bit of the fifth logic means and the carry-out bit equals the combined value of second intermediate output bits;

an inverting means having its input coupled to one output of the fourth logic means for receiving and inverting a fourth intermediate output bit, producing an inverted final output bit of weight $2^n$;

a sixth logic means having inputs coupled to the outputs of fifth and fourth logic means for receiving the fifth intermediate output bits, and coupled to a second bit adder in the multiplier tree for receiving a carry-in bit of weight $2^{n+1}$, summing the fifth intermediate output bits and the carry-in bit, and producing two final output bits of weight $2^{n+1}$ and $2^{n+2}$, such that the combined value of all final output bits and the carry-out bit equals the combined value of the nine partial products bits and the carry-in bit; and such that the production of the carry-out bit of weight $2^{n+2}$ from the fifth logic means is independent of the inputting of the carry-in bit into the sixth logic means.

3. A multiplier tree for summing a plurality of partial products resulting from a multiplication of two binary operands, accepting the plurality of partial products along an input bus, and producing first and second output sums along first and second output buses for summation in a bit adder, comprising:

a plurality of tree slices each having inputs coupled to the input bus for receiving the plurality of partial products and each further coupled to adjacent tree slices for applying carry bits to the adjacent tree slices, where each tree slice receives partial products all having equal weight, for summing the partial products and the applied carry bits and producing first and second output sums;

each tree slice containing a hierarchical arrangement of bit adders, at least one tree slice containing regular arrangements of nine-to-three bit adders having nine inputs for receiving partial products of equal weight and an input for receiving a carry-in bit of greater weight, and having an output and three carry-outputs, for summing the partial products and the carry-in bit to produce three carry-out bits to be applied to adjacent tree slices and an output bit to be applied to further bit adders within the tree slice for further summing, such that the combined value of the three carry-out bits and the output bit equals the combined value of the partial products and the carry-in bit;

each tree slice further containing additional bit adders in the hierarchical arrangement, each additional bit adder having three inputs for receiving either an output bit from a nine-to-three bit adder or a carry-in bit from adjacent tree slices, for summing its inputs and producing an output bit within the tree slice and a carry bit to be applied to an adjacent tree slice, where the output bits from an additional bit adder form part of the first and second output sums where there are three or less bits input into the additional bit adder.

4. The multiplier tree according to claim 3, wherein certain tree slices comprise:

a plurality of nine-to-three bit adders each having nine initial inputs for receiving nine inputs bits of weight $2^n$, where n is an integer, and a carry-input for receiving a carry-in bit of weight $2^{n+1}$, and having three primary outputs coupled to other bit adding means to apply three primary output bits and a carry output coupled to another bit adding means to apply a carry-out bit of weight $2^{n+2}$, for logically combining the input bits with the carry-in bit to produce three primary output bits weighted $2^{n+1}$, $2^{n+2}$ and $2^{n+3}$ and a carry-out bit weight $2^{n+2}$; such that the combined value of the primary output bits and the carry-out it equals to the combined value of the input bits and the carry-in bit.

5. A bit adder for use in a multiplier tree for summing the partial products resulting from a multiplication of two binary operands, comprising:

twenty-seven initial inputs for receiving twenty-seven partial products of weight $2^n$, where n is an integer;

twn carry-inputs for receiving three first carry-inputs of weight $2^{n+1}$, three second carry-inputs of weight $2^n$, three third carry-inputs of weight $2^n$, and one fourth carry-input of weight $2^{n+1}$ from other adders in a multiplier tree;

a plurality of logic elements, each logic element coupled to receive a separate subset of the initial inputs, and a separate subset of the carry inputs, such that all initial inputs and carry inputs are received, for sequentially summing the partial products and the carry-inputs as the carry-inputs are received and producing from the summed inputs three final output bits, comprising a first final output bit of weight $2^n$, a second final output of weight $2^{n+1}$, and a third final output bit of weight $2^{n+2}$;

the logic elements of the bit adder further jointly producing ten carry-outputs comprising three first carry-outputs of weight $2^{n+2}$, three second carry-outputs of weight $2^{n+2}$, three third carry-outputs of weight $2^{n+1}$, and one fourth carry-output of weight $2^{n+2}$;

such that the first, second, third, and fourth carry-outputs of the bit adder respectively become first, second, third, and fourth carry-inputs of other adders used in the multiplier tree, and the production of the each of the first, second, third, and fourth carry outputs is logically independent of the respective input of the first, second, third, and fourth carry-inputs, and such that the combined value of the twenty-seven initial inputs and the ten carry-inputs equals the combined value of the three final output bits and the ten carry-output bits.

6. A bit adder for use in a multiplier tree for summing partial products resulting from a multiplication of two binary numbers, where the bit adder is capable of being combined with other bit adders to form a bit adding array for summing the partial products, the bit adder comprising:

three primary bit adders each having nine initial inputs, such that there are twenty seven initial inputs, for receiving nine partial products, and a carry input for receiving a first level carry-input bit from another bit adder in the multiplier tree, and having one intermediate output, and three carry outputs, and each primary bit adder summing its partial products and first level carry-input bit and producing three first level carry-output bits to be applied to another bit adder in the multiplier tree, and one intermediate output bit and;

a fourth secondary bit adder having three inputs coupled to the intermediate outputs of the three primary bit adders for receiving the three intermediate output bits from the three primary bit adders, and having six inputs for receiving six second level carry-input bits from another bit adder, and a carry input for receiving a second level carry-input bit from another bit adder, summing these inputs to produce three final output bits and a final carry out bit, such that the combined value of the twenty-seven initial inputs and the three first level carry inputs and the second level carry inputs equals the combined value of the three final output bits, the final carry out bit, and the nine first level carry out bits.

7. A multiplier tree for summing $M_1$ through $M_y$ subsets of partial products, each subset containing m partial products resulting from a multiplication of two binary operands, the multiplier tree comprising:

$T_1$ through $T_y$ tree slices, each $T_i$ tree slice for $1'i \leq (y-2)$ coupled to tree slices $T_{i+1}$, $T_{i+2}$, tree slice $T_{y-1}$ coupled to tree slice $T_y$, and tree slice $T_y$ coupled internally, and receiving the $M_i$ subset partial products of equal weight along an input bus, and including $L_1$ through $L_z$ levels of bit adders, each $L_j$ level for $1 \leq j \leq z$ for adding a $m_{i,j}$ subset of partial products comprising:

$p_{i,j}$ counter blocks each having n inputs, where n is a positive integer, coupled to receive n partial products of the $m_{i,j}$ partial products and having x outputs, $p_{i,j}$ equal to the integer component of $(-(m_{i,j}+1)/n)$, for summing the n partial products producing x output bits as partial products, each $p_{i,j}$ counter block in each level $L_j$ in each tree slice $T_i$ for $1 \leq i \leq (y-n+2)$ coupled to a $p_{i+1,j}$ counter block and a $p_{i+2,j}$ counter block to apply carry out bits;

$s_{i,j}$ carry-save adders, $s_{i,j}$ equal the greater of either zero or the integer component of $(((m_{i,j}-p_{i,j}*n)+1)/3)$, each carry-save adder coupled to receive as inputs three partial products of the $m_{i,j}$ partial products, for summing the three partial products and producing two output bits as partial products, the $s_{i,j}$ carry-save adders in each level $L_j$ in each tree slice $T_i$ coupled to a $s_{i+1,j}$ carry-save adder to apply carry out bits;

$w_{i,j}$ wires, $w_{i,j}$ equal to the greater of either zero or $(Mm_{i,j}-p_{i,j}*n-s_{i,j}*3)$, each wire coupled to transmit one partial product of the $m_{i,j}$ partial products to a carry save adder in tree slice $T_i$ in level $L_{j+1}$.

8. A multiplier tree according to claim 7 wherein:

where there is output from each level $L_j$, $m_{i,j}$ partial products, $m_{i,j}$ equal to $(s_{i,j}+w_{i,j}+s_{i,j+1})$;

where each $p_{i,j}$ counter block further comprises d adder delays, wherein if j equals a multiple of the d, then the $m_{i,j}$ partial products output from level $L_j$ includes $(P_{i,j-d+1}+p_{i-2,j-d+1})$ additional partial products; and if j equals a multiple of d, minus 1, then the $m_{i,j}$ partial products output from level $L_j$ includes $(m_{i,j}+p_{i-2,j-d+1}-p_{i-1,j-d+1})$ additional partial products.

9. A multiplier tree according to claim 7 wherein n, the inputs into each $p_{i,j}$ counter block equals nine, x, the outputs from each $p_{i,j}$ counter block, equals three, and d, the number of adder delays in a $p_{i,j}$ counter block, equals three.

10. A multiplier tree according to claim 8 wherein n, the inputs into each $p_{i,j}$ counter block equals nine, x, the outputs from each $p_{i,j}$ counter block, equals three and d, the number of adder delays in a $p_{i,j}$ counter block, equals three.

* * * * *